United States Patent
Hofler et al.

(10) Patent No.: US 8,726,754 B2
(45) Date of Patent: May 20, 2014

(54) METHOD FOR REVERSING THE DIRECTION OF TRAVEL OF A VEHICLE

(75) Inventors: Hans Hofler, Immenstaad (DE); Thomas Kurz, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 545 days.

(21) Appl. No.: 13/124,844

(22) PCT Filed: Sep. 29, 2009

(86) PCT No.: PCT/EP2009/062595
§ 371 (c)(1),
(2), (4) Date: Apr. 19, 2011

(87) PCT Pub. No.: WO2010/046206
PCT Pub. Date: Apr. 29, 2010

(65) Prior Publication Data
US 2011/0197694 A1    Aug. 18, 2011

(30) Foreign Application Priority Data
Oct. 23, 2008 (DE) .......................... 10 2008 043 107

(51) Int. Cl.
*F16H 63/20*    (2006.01)

(52) U.S. Cl.
USPC ....................................... 74/473.1

(58) Field of Classification Search
USPC ................ 74/473.1, 473.11, 473.12, 473.19; 477/171, 172, 168, 169, 174–176
See application file for complete search history.

(56) References Cited

U.S. PATENT DOCUMENTS

| | | |
|---|---|---|
| 3,985,046 A | 10/1976 | Morris et al. |
| 4,246,997 A | 1/1981 | Tarumizu |
| 4,640,394 A | 2/1987 | Higashi et al. |
| 4,768,636 A * | 9/1988 | Ito et al. ......................... 477/71 |
| 4,819,777 A | 4/1989 | Yasue et al. |
| 4,835,694 A | 5/1989 | Yamamoto et al. |
| 5,417,622 A * | 5/1995 | Asayama et al. ............... 477/63 |
| 5,509,520 A | 4/1996 | Evans et al. |
| 5,562,571 A | 10/1996 | Maruyama et al. |
| 5,573,473 A | 11/1996 | Asayama et al. |
| 5,621,643 A | 4/1997 | Nakagami et al. |
| 5,681,238 A | 10/1997 | Minowa et al. |
| 5,720,358 A | 2/1998 | Christensen et al. |
| 5,976,055 A | 11/1999 | Sasaki |

(Continued)

FOREIGN PATENT DOCUMENTS

| | | |
|---|---|---|
| DE | 33 47 256 A1 | 7/1985 |
| DE | 35 17 381 A1 | 11/1985 |

(Continued)

*Primary Examiner* — Troy Chambers
*Assistant Examiner* — Jude Agendia
(74) *Attorney, Agent, or Firm* — Davis & Bujold, PLLC; Michael J. Bujold

(57) ABSTRACT

During reversal of drive of a vehicle, particularly a work machine with a hydrodynamic torque converter and a bypass clutch, the bypass clutch is first disengaged, during the reversal process. Next, a previously engaged first driving direction clutch, driving the vehicle in the first driving direction, is disengaged and a second driving direction clutch, for driving the vehicle in the second driving direction, is engaged so that a speed of the vehicle, in the first driving direction, is reduced and a speed of the vehicle, in the second driving direction, is subsequently accelerated, whereby the drive motor is operated at a higher rotational speed during the reversal process.

12 Claims, 1 Drawing Sheet

(56) References Cited

U.S. PATENT DOCUMENTS

| | | | |
|---|---|---|---|
| 6,017,290 | A | 1/2000 | Kinoshita et al. |
| 6,042,507 | A | 3/2000 | Genise et al. |
| 6,099,435 | A | 8/2000 | Halene et al. |
| 6,181,020 | B1 | 1/2001 | Uchida et al. |
| 6,234,254 | B1 | 5/2001 | Dietz et al. |
| 6,306,061 | B1 | 10/2001 | Inamura et al. |
| 6,314,357 | B1 | 11/2001 | Kon et al. |
| 6,367,345 | B1 * | 4/2002 | Yeh ................................ 74/377 |
| 6,434,466 | B1 * | 8/2002 | Robichaux et al. ............ 701/54 |
| 6,615,963 | B2 | 9/2003 | Ono et al. |
| 6,634,984 | B1 * | 10/2003 | Doering et al. ............... 477/107 |
| 6,997,851 | B2 | 2/2006 | Hofler |
| 7,778,757 | B2 | 8/2010 | Brattberg |
| 7,959,536 | B2 * | 6/2011 | Eisele et al. .................... 477/94 |
| 2004/0166989 | A1 * | 8/2004 | Carlsson ........................ 477/92 |
| 2004/0188168 | A1 | 9/2004 | Aumann |
| 2004/0192505 | A1 * | 9/2004 | Leber et al. .................... 477/169 |
| 2007/0149354 | A1 | 6/2007 | Ota et al. |
| 2008/0000746 | A1 * | 1/2008 | Schiele et al. ................ 192/3.54 |
| 2008/0227600 | A1 * | 9/2008 | Eisele et al. .................... 477/132 |
| 2008/0234906 | A1 | 9/2008 | Warner |
| 2008/0242502 | A1 | 10/2008 | Lin |
| 2009/0054206 | A1 | 2/2009 | Tamba et al. |

FOREIGN PATENT DOCUMENTS

| | | |
|---|---|---|
| DE | 36 26 100 A1 | 2/1987 |
| DE | 37 12 498 A1 | 10/1987 |
| DE | 40 30 811 A1 | 4/1992 |
| DE | 44 27 359 A1 | 2/1995 |
| DE | 44 07 951 A1 | 9/1995 |
| DE | 195 21 458 A1 | 12/1995 |
| DE | 196 36 629 A1 | 3/1997 |
| DE | 198 20 047 A1 | 11/1998 |
| DE | 199 10 049 A1 | 9/1999 |
| DE | 199 25 414 A1 | 12/1999 |
| DE | 698 06 837 T2 | 4/2003 |
| DE | 698 20 922 T2 | 6/2004 |
| DE | 103 14 327 A1 | 10/2004 |
| DE | 103 14 334 A1 | 10/2004 |
| DE | 103 14 337 A1 | 10/2004 |
| DE | 600 08 957 T2 | 1/2005 |
| DE | 103 56 194 A1 | 7/2005 |
| DE | 60 2004 013 201 T2 | 7/2009 |
| EP | 0 907 043 A1 | 4/1999 |
| EP | 1 188 960 A2 | 3/2002 |
| EP | 1 801 294 A1 | 6/2007 |
| FR | 2 557 518 A1 | 7/1985 |
| WO | 2006/011832 A1 | 2/2006 |
| WO | 2006/017902 A1 | 2/2006 |

* cited by examiner

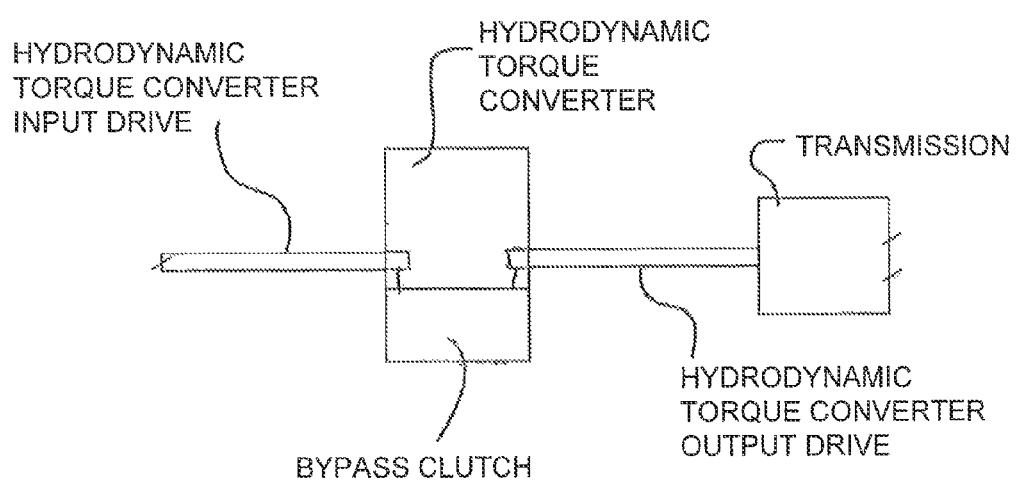

METHOD FOR REVERSING THE DIRECTION OF TRAVEL OF A VEHICLE

This application is a National Stage completion of PCT/EP2009/062595 filed Sep. 29, 2009, which claims priority from German patent application serial no. 10 2008 043 107.9 filed Oct. 23, 2008.

FIELD OF THE INVENTION

The invention relates to a process for reversing the direction of travel of a vehicle in accordance with the governing expression.

BACKGROUND OF THE INVENTION

Construction machinery, for example wheeled loaders, forklifts, backhoe-loaders or telescopic handler, feature some periods, during their operative application, in which they are driven in reverse mode during short work cycles. When a wheeled loader loads a truck from a pallet, it is operated in a so-called Y-mode during which frequent reversing, i.e., immediate change of driving direction, is required.

DE 44 07 951 C2 discloses a motor vehicle drive with a torque converter and a bypass clutch for the torque converter, which is always actuated in the disengaging manner, when a smooth or swing-free operation of the motor vehicle is not guaranteed.

SUMMARY OF THE INVENTION

The subject invention is based on the objective of further improving, via a hydrodynamic torque converter, the reversal of travel direction of a vehicle.

DESCRIPTION OF THE DRAWINGS

The invention will now be described, by way of example, with reference to the sole accompanying FIG. which schematically depicts an exemplary drivetrain according to the invention.

DETAILED DESCRIPTION OF THE PREFERRED EMBODIMENTS

According to the invention, the bypass clutch of the hydrodynamic torque converter, shown schematically in the sole FIG., is always actuated in the disengaging manner when the vehicle performs a reversal of its driving direction.

In an embodiment of the invention, one identifies a reversal of driving direction, when the driving direction lever is shifted into the opposite driving direction, or when the driving direction clutches are driven in an opposing fashion.

In an additional embodiment of the invention, during reversal of the driving direction below a previously defined speed level, the bypass clutch of the hydrodynamic torque converter is actuated in the disengaging manner, and subsequently the first driving direction clutch, previously actuated in the engaging manner, is actuated in the disengaging manner and the second driving direction clutch in the engaging manner, wherewith the vehicle decelerates very rapidly and subsequently accelerates in the opposite direction, without the driving motor losing substantial revolutions and, respectively stalling during the reversal.

During the reversal above a previously defined speed level, the previously engaged first driving direction clutch remains engaged for so long and the second driving direction clutch remains actuated for so long in the disengaging manner, until the vehicle has been reduced in its speed to the previously defined speed level, wherein during this speed reduction, the bypass clutch of the hydrodynamic torque converter remains actuated in the disengaging manner. When the previously defined speed level is reached, the previously engaged first driving direction clutch is actuated, in the disengaging manner, and the second driving direction clutch, in the engaging manner, wherewith the motor vehicle is further decelerated in its driving speed and subsequently accelerated in the new driving direction. After the completion of the reversal process, the bypass clutch of the hydrodynamic torque converter is disconnected again wherein, upon receiving additional operational parameters, the bypass clutch may be actuated in the engaging manner. For example, the bypass clutch of the hydrodynamic torque converter is actuated in the engaging manner, when the turbine torque present in the clutch actuated in the engaging manner and in the clutch of the hydrodynamic torque converter actuated in the disengaging manner, is almost equal.

Through the fact that during a reversal process, the bypass clutch of the hydrodynamic torque converter is actuated in the disengaging manner, the driving motor is not so drastically reduced in its revolutions during the reversal process, which would have been the case with an engaged bypass clutch, which allows for a fast change in driving direction.

The invention claimed is:

1. A method of reversing a driving direction of a vehicle, designed as a work machine, from a first driving direction to an opposite second driving direction, the vehicle being equipped with a hydrodynamic torque converter with a bypass clutch and a transmission for shifting from the first driving direction to the second driving direction, the bypass clutch being engageable in order to directly connect an input drive of the hydrodynamic torque converter to an output drive of the hydrodynamic torque converter, and the bypass clutch being disengageable in order to separate a direct connection between the input drive of the hydrodynamic torque converter and the output drive of the hydrodynamic torque converter, and the driving direction being redirected from a driving speed, in the first driving direction, to a driving speed, in the second driving direction, the method comprising the steps of:
   disengaging the bypass clutch;
   disengaging a previously engaged first driving direction clutch;
   driving the vehicle in the first driving direction;
   engaging a second driving direction clutch, for driving the vehicle in the second driving direction;
   reducing a speed of the vehicle in the first driving direction and subsequently accelerating a speed of the vehicle in the second driving direction, and
   following conclusion of the reversal of the driving direction of the vehicle, upon desired torque being present in the clutches, again engaging the bypass clutch.

2. The method of reversing the driving direction of the vehicle according to claim 1, further comprising the step of engaging the bypass clutch once a torque of a turbine wheel of the torque converter is substantially equal to a previous torque of the bypass clutch before one of engagement and disengagement of the bypass clutch.

3. The method of reversing the driving direction of the vehicle according to claim 1, further comprising the step of calculating the shifting point, for actuating the bypass clutch without changing the driving direction of the vehicle, based upon a rotational speed of a turbine wheel and a rotational speed of a pump wheel of the torque converter.

4. The method of reversing the driving direction of the vehicle according to claim 1, further comprising the step of, following disengagement of the bypass clutch and while the vehicle is traveling above a previously defined speed, leaving the first driving direction clutch, for the previously engaged first driving direction, engaged until the previously defined speed is reached, and subsequently disengaging, the previously engaged first driving direction clutch, and then engaging the second driving direction clutch for providing drive to the vehicle in the second driving direction.

5. The method of reversing the driving direction of the vehicle according to claim 1, further comprising the step of, when the vehicle performs a driving direction reversal, always actuating the bypass clutch of the hydrodynamic torque converter in the disengaging manner.

6. The method of reversing the driving direction of the vehicle according to claim 1, further comprising the step of comparing a torque, present in the clutch actuated in the engaging manner, and a torque, present in the clutch of the hydrodynamic torque converter actuated in the disengaging manner, to determine when the torques are substantially equal as the additional operational parameter.

7. A method of reversing a driving direction of a vehicle from a first driving direction to an opposite second driving direction, the vehicle being equipped with at least a first driving direction clutch, a second driving direction clutch, a hydrodynamic torque converter with a bypass clutch and a transmission for shifting from the first driving direction to the second driving direction, the bypass clutch being engageable for directly connecting an input drive of the hydrodynamic torque converter to an output drive of the hydrodynamic torque converter, and the bypass clutch being disengageable for separating a direct connection between the input drive and the output drive of the hydrodynamic torque converter, and the driving direction being redirected from a driving speed, in the first driving direction, to a driving speed, in the second driving direction, by selective engagement and disengagement of the first and second driving direction clutches, the method comprising the steps of:
 disengaging the bypass clutch;
 disengaging a previously engaged first driving direction clutch, driving the vehicle in the first driving direction, and engaging a second driving direction clutch, for driving the vehicle in the second driving direction, so that a speed of the vehicle, in the first driving direction, is reduced and a traveling speed of the vehicle, in the second driving direction, is subsequently accelerated, and
 following conclusion of the reversal of the driving direction of the vehicle, again engaging the bypass clutch only upon desired torque being present in the clutches.

8. The method of reversing the driving direction of the vehicle according to claim 7, further comprising the step of engaging the bypass clutch only once a torque of a turbine wheel of the torque converter is substantially equal to a previous torque of the bypass clutch before one engagement and disengagement of the bypass clutch, 9. The method of reversing the driving direction of the vehicle according to claim 7, further comprising the step of calculating the shifting point, for actuating the bypass clutch without changing the driving direction of the vehicle, based upon a rotational speed of a turbine wheel and a rotational speed of a pump wheel of the torque converter.

10. The method of reversing the driving direction of the vehicle according to claim 7, further comprising the step of, following disengagement of the bypass clutch and while the vehicle is still traveling above a previously defined speed, leaving the first driving direction clutch, for the previously engaged first driving direction, engaged until the previously defined speed is reached and thereafter subsequently disengaging, the previously engaged first driving direction clutch, and then engaging the second driving direction clutch for providing drive to the vehicle in the second driving direction.

11. A method of reversing a direction of travel of a working machine from a first direction of travel to an opposed, second direction of travel, in which the working machined comprises a hydrodynamic torque converter with a torque lockup clutch and a gearbox for switching from the first direction of travel to the second direction of travel, the torque lockup clutch can be activated, in an engaging direction, in order to connect an input of the hydrodynamic torque converter directly to an output of the hydrodynamic torque converter, and can be activated in a disengaging direction in order to disconnect the input of the hydrodynamic torque converter from the output of the hydrodynamic torque converter, and at a previously defined speed level, a direction of travel is reversed from a velocity in the first direction of travel to a velocity in the second direction of travel, the method comprising the steps of:
 activating the torque lockup clutch in the disengaging direction;
 activating a first direction of travel clutch in a disengaging direction;
 activating a second direction of travel clutch in an engaging direction;
 reducing a speed of the vehicle in the first direction of travel and subsequently accelerating the speed of the vehicle in the second direction of travel;
 after conclusion of the reversing process, disengaging the torque lockup clutch, and
 once a desired torque being present in the clutches, activating the torque lockup clutch in the engaging direction.

12. The method of reversing the driving direction of the vehicle according to claim 11, further comprising the step of verifying that a turbine torque present in the clutch actuated in the engaging manner and a turbine torque present in the clutch of the hydrodynamic torque converter, actuated in the disengaging manner are substantially equal.

* * * * *